United States Patent [19]

Kitchen

[11] 4,267,284
[45] May 12, 1981

[54] TOUGH, TRANSPARENT ARTICLES FROM STYRENE POLYMERS BLENDED WITH CERTAIN BLOCK-RANDOM COPOLYMERS

[75] Inventor: Alonzo G. Kitchen, Bartlesville, Okla.

[73] Assignee: Phillips Petroleum Company, Bartlesville, Okla.

[21] Appl. No.: 757,526

[22] Filed: Jan. 7, 1977

[51] Int. Cl.³ .......................................... C08F 293/00
[52] U.S. Cl. ..................................................... 525/99
[58] Field of Search ...................... 260/876 B, 880 B; 525/99

[56] References Cited

U.S. PATENT DOCUMENTS

| | | | |
|---|---|---|---|
| 2,863,849 | 12/1958 | Fordham | 260/45.5 |
| 2,975,160 | 3/1961 | Zelinski | 260/880 B |
| 3,041,310 | 6/1962 | Luftglass | 260/45.5 |
| 3,476,829 | 11/1969 | Gruver et al. | 260/876 B |
| 3,637,554 | 1/1972 | Childers | 260/23.7 R |
| 3,907,931 | 9/1975 | Durst | 260/876 B |
| 3,950,292 | 4/1976 | Cooper | 260/23.7 R |

FOREIGN PATENT DOCUMENTS 408927 4/1967 Australia.
2504118 8/1975 Fed. Rep. of Germany.
1415718 11/1975 United Kingdom.

*Primary Examiner*—Hosea E. Taylor
*Assistant Examiner*—Amelia B. Yarbrough

[57] ABSTRACT

A blend comprising (1) 20 to 70 weight percent of a styrene polymer, and (2) 30 to 80 weight percent of a resinous copolymer having a polymerized monovinyl-substituted aromatic compound block and a polymerized monovinyl-substituted aromatic compound/conjugated diene random copolymer block. Such blends have been found to possess outstanding toughness and excellent clarity.

12 Claims, No Drawings

TOUGH, TRANSPARENT ARTICLES FROM STYRENE POLYMERS BLENDED WITH CERTAIN BLOCK-RANDOM COPOLYMERS

BACKGROUND OF THE INVENTION

This invention relates to impact styrene polymer blends.

It is well known to blend rubber with styrene polymers to improve the impact strength of the styrene polymer. However, the use of rubber in styrene polymers tends to adversely affect other properties, such as clarity, before any significant improvement in impact is achieved.

SUMMARY OF THE INVENTION

It is an object of this invention to provide a styrene polymer composition having greatly improved impact strength and good clarity.

It is a further object of this invention to provide a method of producing impact resistant styrene polymer compositions.

And it is a further object of this invention to provide a styrene polymer composition having a disproportionately high impact value for the percentage of polymerized diene present in the styrene-diene impact modifier.

In accordance with this invention, there is provided a blend comprising a styrene polymer and a resinous copolymer having a terminal monovinyl-substituted aromatic compound polymer block and a terminal monovinyl-substituted aromatic compound/diene random copolymer block.

DESCRIPTION OF THE PREFERRED EMBODIMENTS

An improved impact grade styrene polymer composition is obtained by blending a styrene polymer with a resinous copolymer having a polymerized monovinyl-substituted aromatic compound block and a random monovinyl-substituted aromatic compound/conjugated diene copolymer block. Articles made from the resulting blend in addition to having unexpectedly high impact strength are surprisingly clear.

The styrene polymers suitable for this invention are those commercially available, resinous, general purpose polymers which normally consist essentially of polymerized styrene. A styrene homopolymer generally referred to as crystal polystyrene is preferred. However, a styrene polymer can be employed which can contain from about 5 to about 10 weight percent (total) of one or more of other copolymerizable ethylenically unsaturated compounds such as alpha-methylstyrene, acrylonitrile, methyl methacrylate, and the like. These comonomers and polymerization thereof, are described in more detail in U.S. Pat. No. 3,907,931 issued to Durst on Sept. 23, 1975, the disclosure of which is hereby incorporated by reference.

The resinous polymer containing a monovinyl-substituted homopolymer block and a monovinyl-substituted aromatic compound/conjugated diene copolymer block, which is blended with the styrene polymer, is referred to herein as an impact modifier. British Pat. No. 1,415,718, the disclosure of which is incorporated hereby by reference, discloses the preparation of block polymers having a polymerized styrene block and a butadiene/styrene copolymer block. Random polymerization of the conjugated diene monovinyl-substituted aromatic compound block is achieved by adding one or more polar additives such as tetrahydrofuran. Another suitable class of polar additives is described in U.S. Pat. No. 3,294,768, issued to Wofford on Dec. 27, 1966. These additives are organic compounds of sodium, potassium rubidium or cesium, e.g. alkoxides.

The proportion of styrene polymer and the impact modifier can be varied widely. Generally, the impact modifier will make up from about 30 weight percent to about 80 weight percent of the blend, more preferably from about 35 to about 75 weight percent of the blend, most preferably about 50 weight percent of the blend, the styrene polymer making up the remaining 20 to 70, preferably 25 to 65, most preferably about 50 weight percent of the blend. Of course the blend compositions and the components thereof can contain conventional additives such as antioxidants, U.V. stabilizers, and if clarity is not essential, pigments, fillers and the like. The above percentages of styrene polymer and impact modifier being based on the polymeric ingredients.

The impact modifier is more explicitly characterized as constituting a terminal random monovinyl-substituted aromatic compound/conjugated diene copolymer segment and a terminal monovinyl-substituted aromatic compound homopolymer segment. The amount of total polymerized monovinyl-substituted aromatic compound in the monovinyl-substituted aromatic compound/conjugated diene block polymer impact modifier can range from about 60 to about 90 weight percent, preferably from about 65 to 85 weight percent based on the weight of said impact modifier, the remaining 10–40, preferably 15–35 weight percent of the block polymer impact modifier being polymerized conjugated diene. The monovinyl-substituted aromatic compound homopolymer block in the block polymer can range from about 40 to about 60 weight percent, preferably from 45 to 55 weight percent based on the weight of the total polymerized monovinyl-substituted aromatic compound.

Thus, the quantity of randomly polymerized monovinyl-substituted aromatic compound ranges from about 40 to about 60, preferably 45 to 55 weight percent based on the total weight of monovinyl-substituted aromatic compound polymerized. Put another way, this corresponds to from about 54 weight percent randomly polymerized monovinyl-substituted aromatic compound (based on the total polymer) in a block polymer having a 90/10 weight ratio of monovinyl-substituted aromatic compound/conjugated diene in the total polymer and containing 40 weight percent monovinyl-substituted aromatic compound homopolymer block, to about 24 weight percent randomly polymerized monovinyl-substituted aromatic compound (based on the total polymer) in a block polymer having a 60/40 weight ratio of monovinyl-substituted aromatic compound/conjugated diene in the total polymer and containing 60 weight percent monovinyl-substituted aromatic compound homopolymer block based on the total monovinyl-substituted aromatic compound. The weight average molecular weight of the copolymer can range from about 50,000 to about 250,000. Below about 50,000 the physical properties are not suitable. Above about 250,000 haze begins to become excessive, melt flow is so low that processability is decreased, melt flow drop-off increases and good mixing is harder to achieve.

Suitable monovinyl-substituted aromatic compounds for use in the impact modifier are those containing 8 to 18 carbon atoms per molecule. Examples of suitable compounds include styrene, 3-methylstyrene, 4-n-propylstyrene, 4-cyclohexylstyrene, 4-decylstyrene, 2-ethyl-4-benzylstyrene, 4-p-tolylstyrene, 4-(4-phenyl-n-butyl)-styrene, 1-vinylnaphthalene, 2-vinylnaphthalene, and the like, and mixtures thereof. Styrene is the preferred monovinyl-substituted aromatic compound.

Suitable conjugated dienes or mixtures thereof that can be used in this invention include those having 4 to 12 carbon atoms per molecule, those containing 4 to 8 carbon atoms being preferred. Exemplary of suitable compounds are 1,3-butadiene, isoprene, 2,3-dimethyl-1,3-butadiene, piperylene, 3-butyl-1,3-octadiene, and the like. The preferred dienes are 1,3-butadiene and isoprene, most preferably 1,3-butadiene.

In general, the impact modifiers can be produced in two ways depending upon the order of addition of the components in the solution polymerization process employed.

I. Randomizer, all of the monovinyl-substituted aromatic compound and conjugated diene, initiator.

II. Randomizer, about 70 weight percent of the monovinyl-substituted aromatic compound and 100 weight percent of the conjugated diene, initiator, time for polymerization, remaining monovinyl-substituted aromatic compound.

Depending on the effectiveness of the randomizer 0.1 to 10 moles of randomizer per 1 mole of initiator is used, this being sufficient to prevent formation of any poly(conjugated diene) blocks which would impair the transparency of the resulting block-random polymer but insufficient to prevent the resulting block-random polymer from having 40 to 60 percent block monovinyl-substituted aromatic compound based on the total monovinyl-substituted aromatic compound. With tetrahydrofuran this is preferably about 5 to 10 moles per 1 mole of initiator and with tetramethylethylenediamine it is preferably about 0.1 to 0.6 moles per 1 mole of initiator.

EXAMPLE 1

A series of linear block polymers made up of a random styrene-butadiene copolymer block terminated with a polystyrene block was prepared in a stirred 5 gallon (0.02 m$^3$) stainless steel reactor containing about 6.6 kg cyclohexane and sufficient tetrahydrofuran to provide 0.5 parts by weight tetrahydrofuran per 100 parts by weight monomer (phm). Generally, to the cyclohexane solution at room temperature (i.e., about 25° C.), was charged all the butadiene (B), at least about 70 weight percent of the styrene (S) and a specified quantity of n-butyllithium (NBL, 7.5 weight percent in cyclohexane). After polymerization of the random block was substantially complete, the remaining styrene (if any) was charged, and allowed to polymerize. A total of 3000 g of monomers was used in each run to obtain a cement containing about 30 weight percent solids. Two runs at each styrene/butadiene ratio were made. Following the second styrene charge, if used, the reactor charge is contacted for about 20–30 minutes at about 200°±10° F. (93°±6° C.) with about 0.2 phm water and about 0.1 phm carbon dioxide. Following this treatment, an antioxidant solution containing 50 weight percent of a mixture consisting of tris(nonylphenyl)-phosphite (TNPP) and 2,6-di-t-butyl-4-methylphenol (BHT) dissolved in cyclohexane was added. Sufficient solution was added to provide 1.5 phm TNPP and 0.5 phm BHT and mixed about 10 minutes. Thereafter, like cements were combined and approximately 38 volume percent of solvent was boiled off and the remaining solution was flashed at about 335° F. (168° C.). The recovered polymer can be additionally devolatilized in a vacuum oven at about 100° C., if desired.

Additional polymerization details and properties of each resin alone and the composite with its appropriate duplicate are presented in Table I. The reason for producing a composite of two duplicate runs was to obtain a larger sample for testing. The following abbreviations are used: $M_w$=weight average molecular weight and $M_n$=number average molecular weight.

Preparation methods I and II, earlier described, were employed to produce the impact modifiers.

TABLE 1

Preparation and Properties of Block-Random Styrene/Butadiene Copolymers

| Run No. | Grams Monomers Charged First S | B | Second S | Wt. % Monomers S | B | NBL (phm) | Melt[1] Flow | Composite Run No. | Unsaturation Vinyl | Trans | Mole Wt. × 10$^{-3}$ $M_w$ | $M_n$ | Polymerized Styrene Wt. % of Copolymer Block[2] | Random | Melt Flow |
|---|---|---|---|---|---|---|---|---|---|---|---|---|---|---|---|
| 1A | 1680 | 600 | 720 | 80 | 20 | 0.060 | 6.7 | 1 | 5.5 | 9.7 | 180[3] | 150[3] | 44.1 | 35.9 | 6.1 |
| 1B | 1680 | 600 | 720 | 80 | 20 | 0.060 | 5.6 | | | | | | | | |
| 2A | 1575 | 750 | 675 | 75 | 25 | 0.065 | 4.4 | 2 | 7.2 | nd[4] | 158[5] / 154[3] | 129[5] / 125[3] | 36.3 | 38.7 | 6.6 |
| 2B | 1575 | 750 | 675 | 75 | 25 | 0.070 | 12.0 | | | | | | | | |
| 3A | 2250 | 750 | 0 | 75 | 25 | 0.065 | 6.2 | 3 | 5.9 | 11.3 | 157[3] | 130[3] | 33.1 | 41.9 | 7.2 |
| 3B | 2250 | 750 | 0 | 75 | 25 | 0.065 | 8.9 | | | | | | | | |
| 4A | 1575 | 750 | 675 | 75 | 25 | 0.065 | 8.9 | 4 | 6.8 | 11.5 | 157[3] | 130[3] | 38.6 | 36.4 | 8.1 |
| 4B | 1575 | 750 | 675 | 75 | 25 | 0.065 | 7.6 | | | | | | | | |
| 5A | 1050 | 900 | 1050 | 70 | 30 | 0.065 | 5.0 | 5 | 8.8 | 12.8 | 153[5] / 152[3] | 127[5] / 124[3] | 35.3 | 34.7 | 6.3 |
| 5B | 1470 | 900 | 630 | 70 | 30 | 0.070 | 9.9 | | | | | | | | |

[1]ASTM D1238-65T, 200° C., 5 kg load, g/10 minutes.
[2]Determined by osmium tetroxide degradation. (British 1,415,718).
[3]Calculated based on a poison level of 0.0170 phm of NBL.
[4]Not determined.
[5]Determined by gel permeation chromatography (GPC) in addition to the calculated determination, footnote 3, and as can be seen there in close agreement between the two methods of measurement.

EXAMPLE 2

A series of blends was prepared by mixing (1) each copolymer composite (impact modifier) described in Example 1 with (2) a commercially available general purpose (crystal) polystyrene. In addition, blends of (1) Solprene ® 407 rubber (70/30 styrene/butadiene block copolymer having a terminal polystyrene homopolymer block and terminal polybutadiene homopolymer block) and (2) crystal polystyrene and (1) branched block styrene/butadiene polymer and (2) crystal polystyrene, were prepared as controls. Each blend was mixed by passage through a heated 1½" extruder equipped with a mixing screw, converted into strands and cut into pellets. The melt flow of each pelleted blend was determined as before. Each pelleted blend was subsequently extruded in the form of sheet 0.020" (0.05 cm) in thickness and the percent haze determined according to ASTM D1003. The tensile strength and elongation of the sheet were determined according to ASTM D638-64T with a crosshead speed of 0.2" (0.5 cm) per minute. The dart impact values were determined according to ASTM D1709 by dropping a weighted dart from a height of 26" (66 cm) above the sheet. The weight in grams required to rupture a sheet in 50% of the drops is recorded as the dart impact value. A specimen is impacted only one time with the dart.

The blends were 50-50 polystyrene-impact modifier, the impact modifier having from 70 to 80 weight percent polymerized styrene based on the total weight of the impact modifier and having about 35-44 weight percent, based on the weight of the impact modifier, of polymerized styrene in the homopolymer block. These blends are further characterized by having from about 45 to about 56 weight percent styrene in the random copolymer block based on the total styrene in the impact modifier. Polymer blends having a dart impact greater than 0.6 ft.-lbs. were obtained at a conjugated diene content of the impact modifier of no more than 20 weight percent based on the weight of the impact modifier and greater than 1 at no more than 30 weight percent conjugated diene in the impact modifier. Values for dart impact of greater than 2 are possible with a conjugated diene content in the impact modifier of no more than 35 weight percent, based on the weight of the impact modifier.

The results are presented in Table 2.

TABLE 2

| | | Blends of Polystyrene With Impact Modifiers | | | | | | |
|---|---|---|---|---|---|---|---|---|
| | | | | Impact Modifier Description | | | | |
| Run[1] No. | Impact Modifier Type | Blend Melt Flow | S/B Wt. Ratio | Melt Flow | Polymerized Styrene[2] | | Polymerized Styrene[3] | |
| | | | | | Block | Random | Block | Random |
| 11 | KRO3 resin[6] | 6.6 | 76/24 | 6 | 76 | 0 | 100 | 0 |
| 12 | Solprene 407[8] | 10.5 | 70/30 | 11.0 | 48.7 | 21.3 | 69.6 | 30.4 |
| 13 | Blend 1, Table 1 | 7.6 | 80/20 | 6.1 | 44.1 | 35.9 | 55.1 | 44.9 |
| 14 | Blend 2, Table 1 | 7.4 | 75/25 | 6.6 | 36.3 | 38.7 | 48.4 | 51.6 |
| 15 | Blend 3, Table 1 | 8.4 | 75/25 | 7.2 | 33.1 | 41.9 | 44.1 | 55.9 |
| 16 | Blend 5, Table 1 | 6.6 | 70/30 | 6.3 | 35.3 | 34.7 | 50.4 | 49.6 |

| | | Properties of 20 Mil Sheet | | | | | | | | Hardness |
|---|---|---|---|---|---|---|---|---|---|---|
| | | | | | Tensile Strength | | | | Elongation % | Shore |
| Run[1] No. | Impact Modifier Type | Haze % | Dart Grams | Impact Ft.-Lbs. | TD[4] | | MD[5] | | | |
| | | | | | (psi) | (kPa) | (psi) | (kPa) | TD | MD | D |
| 11 | KRO3 resin[6] | 2.5 | 61 | 0.29 | 4290 | 29580 | 5470 | 37710 | 15 | 5 | 78[7] |
| 12 | Solprene 407[8] | 18.7 | 113 | 0.54 | 3000 | 20680 | 5590 | 38540 | 5 | 8 | 78[7] |
| 13 | Blend 1, Table 1 | 2.0 | 149 | 0.71 | 4840 | 33370 | 5270 | 36340 | 7 | 7 | 80[9] |
| 14 | Blend 2, Table 1 | 4.6 | 168 | 0.80 | 3130 | 21580 | 5570 | 38400 | 123 | 57 | 78[9] |
| 15 | Blend 3, Table 1 | 3.6 | 153 | 0.73 | 3010 | 20750 | 5340 | 36820 | 163 | 63 | 78[9] |
| 16 | Blend 5, Table 1 | 6.5 | 497 | 2.4 | 2690 | 18550 | 5680 | 39160 | 130 | 43 | 76[9] |

[1]50 weight percent commercial polystyrene resin, 9 melt flow; $M_w$ = 302,000 (GPC) plus 50 weight percent impact modifier.
[2]Weight percent based on total polymer (calculated).
[3]Weight percent based on total polymerized styrene.
[4]Transverse direction.
[5]Machine direction: i.e., same direction sheet moves as extruded.
[6]Commercial resin, radial block copolymer as disclosed in Kitchen 3,639,517 having a dart impact of 2.4, 5 melt flow; nominal $M_w$ of 140,000-180,000 (GPC).
[7]Control.
[8]70/30 butadiene/styrene graded block copolymer, 11 melt flow, 48.7 wt. % terminal block polymerized styrene and 21.3 weight percent random polymerized styrene based on total polymer (calculated) with terminal butadiene homopolymer block.
[9]Invention.

As can be seen by Control Run 11, a radial block copolymer was ineffective to giving a high impact blend, even though the block copolymer itself had a high impact strength. Control Run 12 shows that a graded block copolymer even at a 30 percent butadiene content failed to give a satisfactory impact strength as evidenced by the value of 0.54. Runs 13-15 show that with the block-random copolymer, relatively high impact strengths were obtained with impact modifiers having only 20 percent diene content. This then allows the production of impact grade blends still having relatively high hardness values and other values associated with high styrene content. Invention Run 16 shows that at a 30 percent butadiene content (the same as Control Run 12) an impact strength of 2.4 was achieved, which is almost 5 times the impact strength of the Control Run 12, which utilized the same diene content. These results, then, show that the block-random copolymer in blends with polystyrene gives a product having a disproportionately high impact strength as compared with that obtained using other impact modifiers having the same diene content. Indeed the blends of the invention utilizing a diene content as little as 20 percent (Invention Run 13) have superior properties to that of Control Run 12 utilizing 30 percent diene content in the impact modifier.

EXAMPLE 3

Similar blends were made using isoprene in place of butadiene in the impact modifier and the blends had good physical appearance but no tests were run on the blends.

While the invention has been described in detail for the purpose of illustration, it is not to be construed as limited thereby but is intended to cover all changes in modifications within the spirit and scope thereof.

I claim:

1. A blend comprising
   20–70 weight percent based on a total weight of the blend of a styrene polymer and
   30–80 weight percent based on the total weight of said blend of an impact modifier having a terminal monovinyl-substituted aromatic compound/conjugated diene random copolymer block segment and a terminal monovinyl-substituted aromatic compound homopolymer block segment, said monovinyl-substituted aromatic compound being present in said impact modifier in an amount within the range of 60 to 90 weight percent based on a total weight of said impact modifier, said monovinyl-substituted aromatic compound homopolymer block containing from 40 to 60 weight percent of a total of the monovinyl-substituted aromatic compound in said impact modifier.

2. A composition according to claim 1 wherein said styrene polymer is polystyrene, said monovinyl-substituted aromatic compound is styrene and said conjugated diene is selected from 1,3-butadiene and isoprene.

3. A composition according to claim 2 wherein said conjugated diene is 1,3-butadiene.

4. A composition according to claim 3 wherein said impact modifier comprises 35 to 75 weight percent of said blend.

5. A composition according to claim 3 wherein said amount of said monovinyl-substituted aromatic compound is present in said impact modifier in an amount within the range of 65 to 85 weight percent based on the total weight of said impact modifier and wherein said homopolymer block segment contains 45 to 55 weight percent of the total monovinyl-substituted aromatic compound.

6. A composition according to claim 3 wherein said blend has a dart impact strength greater than 0.6 ft.-lbs. when said conjugated diene is present in said impact modifier in an amount of no more than 20 weight percent.

7. A composition according to claim 3 wherein said blend has a dart impact strength greater than 2 ft.-lbs. when said conjugated diene is present in said impact modifier in an amount of no more than 35 weight percent.

8. A composition according to claim 3 wherein said styrene polymer and said impact modifier are present in about a 50/50 weight ratio, said impact modifier contains from 70 to 80 weight percent styrene, based on the total weight of the impact modifier, and wherein said styrene content of said random copolymer block of said impact modifier is within the range of 45 to 55 weight percent based on the total weight of styrene in said impact modifier.

9. A composition comprising
   20–70 weight percent based on a total weight of the blend of a styrene polymer, and
   30 to 80 weight percent based on the total weight of said blend of an impact modifier prepared by introducing into a reaction zone a randomizer, thereafter at least 70 weight percent of a monovinyl-substituted aromatic compound, a conjugated diene, and thereafter an organo metal initiator, said randomizer being used in an amount within the range of 0.1 to 10 moles per 1 mole of said initiator,
   said monovinyl-substituted compound being introduced in an amount within the range of 60 to 90 weight percent and said conjugated diene in an amount within the range of 10 to 40 weight percent based on a total weight of both said monovinyl-substituted aromatic compound and said conjugated diene.

10. A composition according to claim 9 wherein said styrene polymer is polystyrene, said randomizer is tetrahydrofuran, said monovinyl-substituted aromatic compound is styrene, said conjugated diene is 1,3-butadiene and said initiator is n-butyllithium, and said tetrahydrofuran is introduced in an amount within the range of 5 to 10 moles per 1 mole of n-butyllithium.

11. A composition according to claim 9 wherein all of said monovinyl-substituted aromatic compound is added at once.

12. A composition according to claim 9 wherein about 70 weight percent of said monovinyl-substituted aromatic compound is added after said randomizer and the remainder after said initiator has been added and time has elapsed for polymerization.

* * * * *